April 18, 1967 R. J. J. DE COURCY 3,314,297
VIBRATORY APPARATUS
Filed May 15, 1964
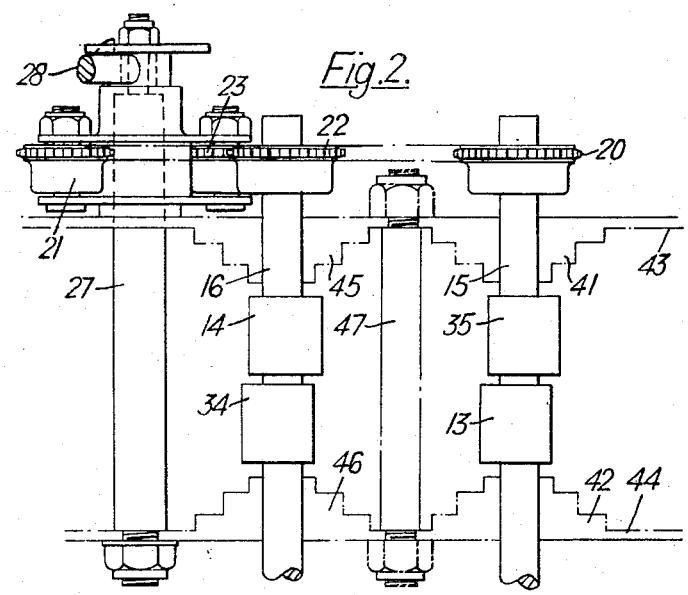
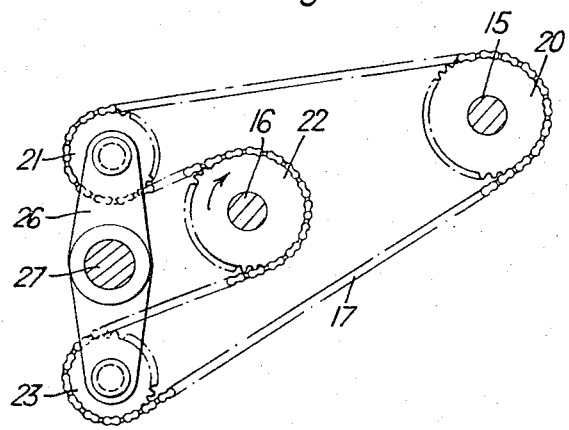

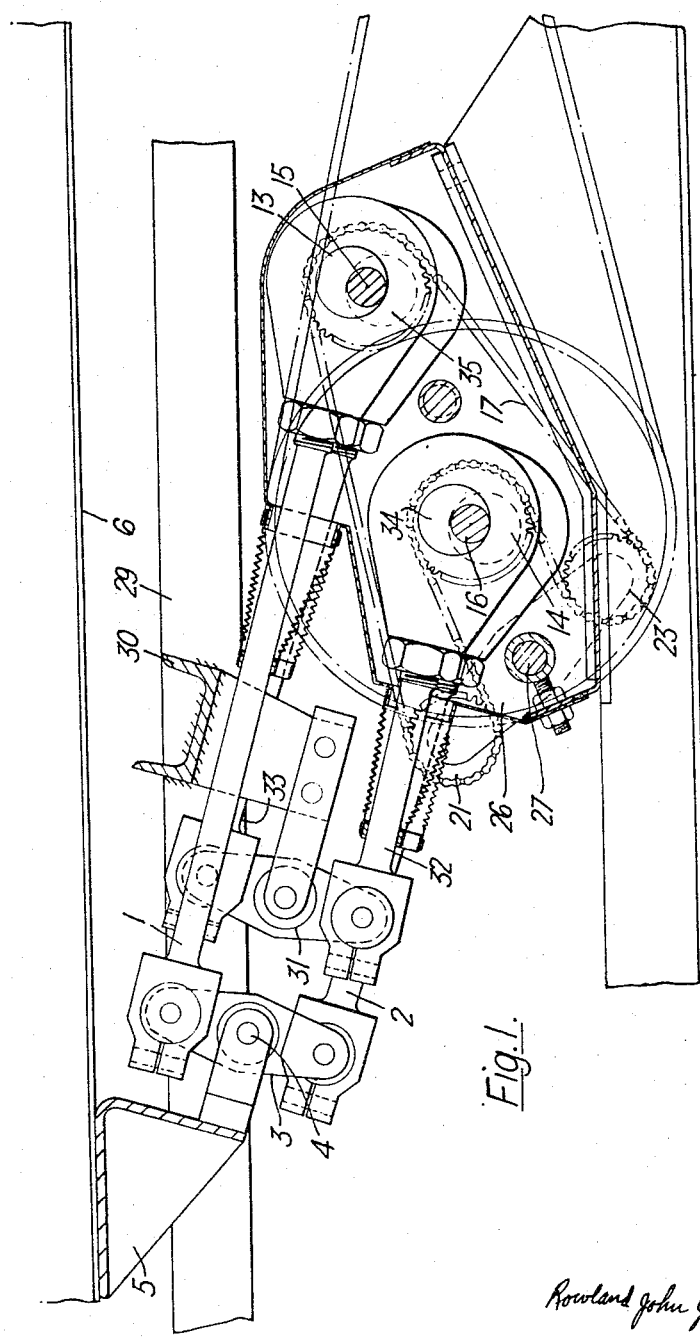

United States Patent Office 3,314,297
Patented Apr. 18, 1967

3,314,297
VIBRATORY APPARATUS
Rowland John James de Courcy, London, England, assignor to Baker Perkins Incorporated, Saginaw, Mich., a corporation of Michigan
Filed May 15, 1964, Ser. No. 367,759
Claims priority, application Great Britain, May 17, 1963, 19,751/63
7 Claims. (Cl. 74—26)

This invention relates to mechanically driven vibratory apparatus used for industrial purposes such as vibratory conveyors, screens, feeders, and tamping-down units, for example. The invention is particularly concerned with the driving mechanism for such apparatus. The driving mechanism normally comprises an eccentric mounted on a driving shaft and connected to the part of the apparatus which is to be vibrated by means of a connecting rod. It is frequently necessary that the amplitude of the vibration should be adjustable so as to vary the rate of feed of a vibratory conveyor, for example. For this purpose, two eccentric shafts are used, one driven from the other, and the connecting rods are connected to opposite ends of a link which is pivoted at its middle to the part which is to be vibrated. If the two eccentrics are in phase with one another the two ends of the link will move in unison and the pivot point will also move through the same stroke so as to transmit maximum vibration to the part in question. If, however, the two eccentrics are completely out of phase, the two ends of the link will move in opposite directions and the pivot point will remain stationary, so that no vibration is transmitted to the part in question. For any intermediate phase relationship of the two eccentrics a corresponding proportion of the total stroke will be transmitted to the part to be vibrated.

In order to vary the stroke of the vibration applied to the part, it is necessary to adjust the relative phases of the two eccentrics and since one eccentric shaft is driven from the other it is therefore necessary to make a corresponding adjustment to the drive between the two shafts. This entails stopping the mechanism since it is impossible to carry out the adjustment while the vibration is taking place.

According to the present invention one of the eccentric shafts is driven from the other by drive transmitting means such as an endless chain passing around chain wheels turning with the respective shafts, the chain forming a closed path having a length greater than twice the length of the direct closed path around the chain wheels so as to provide an excess length of chain and the excess chain in each of the two runs between these two wheels being taken up by idler sprockets of which the axes are so linked together that movement of one sprocket in a direction such as to increase the excess of chain in the respective run leads to a corresponding movement of the other sprocket in a direction such as to decrease the excess in the other run and vice-versa. If, for purposes of explanation, one of the shafts is regarded as fixed, movement of the sprockets so as to transfer excess chain from one run to the other will cause the other shaft to turn through an angle dependent on the length of chain transferred. Since the adjustment entails only movement of the two idler sprockets, it is perfectly possible for it to be carried out while the shafts are turning, with the result that the driven shaft is turned through an angle in relation to the driving shaft, leading to a corresponding adjustment in the relative phases of the two eccentrics. In other words, the stroke of the vibration may be varied from a maximum to a minimum and vice versa while the mechanism is actually running and without any discontinuity in the operation of the vibrating part.

Such a facility is particularly advantageous when applied to a conveyor since it provides an instantly controllable flow of material at the discharge end of the conveyor irrespective of the distance from the inlet. It may also provide direct fed into a batch weigher or for sack filling and so forth, the instantaneous flow control eliminating the necessity for a valve or buffer storage hopper. The ability to adjust the stroke of vibration is also correspondingly useful in the other types of apparatus referred to above.

In order to provide the necessary relationship between the movements of the two idler sprockets they may be mounted on a common member capable of movement in such a way as to produce the necessary redistribution of the chain. The two eccentric shafts preferably turn in opposite directions, the idler sprocket being so located that the path of the chain passes around the one chain wheel, extends past the second chain wheel and around one idler sprocket, doubles back on itself to pass around the side of the second chain wheel adjacent the first and then doubles back on itself again to pass around the second sprocket and thereafter complete the circuit. The necessary adjustment in then achieved by moving the idler sprockets in a general direction towards and away from the first chain wheel. For this purpose the sprockets may be mounted at opposite ends of a pivoted yoke so that when this is turned about its pivot the sprockets move in opposite directions to increase the length of one run of chain and decrease the length of the other.

A construction of driving mechanism in accordance with the invention and operating in the manner just mentioned will now be described in more detail with reference to the accompanying drawings in which:

FIGURE 1 is an elevation of the mechanism as a whole with various shafts shown in section;

FIGURE 2 is a plan view corresponding to the right-hand part of FIGURE 1; and,

FIGURE 3 is a view corresponding to FIGURE 1 illustrating specifically the path of a driving chain.

Turning first to FIGURE 1 the mechanism comprises essentially a pair of connecting rods 1 and 2 which are pivoted at their left-hand ends to a common link 3. The mid-point of this link is connected by way of a pivot 4 to a bracket 5 forming part of a conveyor mechanism adapted to be vibrated and a part of which is seen at 6. The connecting rods 1 and 2 are driven by eccentrics 13 and 14 mounted on shafts 15 and 16 respectively. The shaft 15 is driven from an external source (not shown) and the shaft 16 is driven from the shaft 15 by way of a chain 17, the path of which is best seen from FIGURE 3. From this figure it can be seen that the path of the chain 17 is round a chain wheel 20 on the shaft 15 then round an idler sprocket 21 after which it doubles back on itself to pass round the right-hand side of a chain wheel 22 on the shaft 16 and then doubles back on itself again to pass round a second idler sprocket 23 after which it completes the circuit back to the chain wheel 20. The two shafts 15 and 16 therefore turn in opposite directions and their rotation is converted into reciprocation of the connecting rods 1 and 2.

As described initially if the rods 1 and 2 are in phase their motion is transmitted to the link 3 and hence to the conveyor 6. On the other hand if the movements of the rods are completely out of phase the two ends of the link 3 move in opposite directions and no motion is transmitted to the conveyor 6. Consequently the stroke of the movement transmitted to the conveyor is adjusted by variation of the phase relationship between the two connecting rods, that is to say, by adjusting the relative angular positions of the shafts 15 and 16.

For this purpose the sprockets 21 and 23 are mounted at opposite ends of a yoke 26 pivoted at its mid-point on a shaft 27 best seen in FIGURE 2 which is capable of being rocked by a radially extending handle 28. If the shaft 27 is turned in a clockwise direction as seen in FIGURE 3 the sprocket 21 is moved to the right and the sprocket 23 is moved to the left thus decreasing the length of chain in the upper run between the chain wheels 20 and 22 and increasing the length of chain in the lower run. As previously explained this causes a relative angular movement of the shaft 16 in a clockwise direction with respect to the shaft 15 and thus brings about a phase adjustment which in its turn varies the stroke of the conveyor 6. This adjustment can be carried out while the conveyor is running merely by operation of the handle 28 as just described.

The conveyor illustrated is of the balanced type in which a counterweight is caused to vibrate in phase opposition to the main body of the conveyor so as to achieve a state of dynamic balance. This counterweight is shown as 29 and is welded to a bracket 30 which is connected to the mid-point of a link 31 similar to the link 3. The link 31 is connected to the ends of a pair of connecting rods 32 and 33 similar to the connecting rods 1 and 2 and operating in the same manner. Thus the connecting rod 32 is driven by an eccentric 34 on the shaft 16 while the connecting rod 33 is driven by an eccentric 35 on the shaft 15. The positions of these eccentrics on these shafts are best seen in FIGURE 2 which illustrates further detail of the assembly as a whole. Thus it will be seen that the shaft 15 turns in bearings 41 and 42 mounted on side plates 43 and 44 respectively. The shaft 16 similarly turns in bearings 45 and 46 and the side plates 43 and 44 are held together by a tie bar 47. The mechanism is thus completely self-contained and requires only an external source of power to provide the variable drive just described.

As mentioned above the adjustment of the drive in this way is particularly advantageous when applied to a conveyor but it can also be used with other types of vibratory apparatus such as screens, feeders and so forth. Such mechanisms may also be used to drive a variety of other forms of vibratory or reciprocatory apparatus. For example, the drive may be applied to a pump to give a continuously variable stroke and hence a continuous variation in the output of the pump.

I claim:

1. Variable speed driving mechanism for a vibratory or reciprocatory device, said mechanism comprising a first link having means for pivoting it midway between its ends on said device; a driven, first rotatable, eccentric shaft; a second rotatable, eccentric shaft spaced from said first shaft; a first connecting rod journaled at one end on said first eccentric shaft and pivoted at its other end to one end of said link; a second connecting rod journaled at one end on said second eccentric shaft and pivoted at its other end to the other end of said link; drive transmitting means drivingly interconnecting said first and second shafts for transmitting rotation of either of said shafts to the other, said transmitting means including an endless member forming a closed path of greater length than twice the distance between said shafts thereby providing an excess length of said transmitting means; a second link; pivotal means mounting said second link to rock about an axis; a pair of idler members journaled respectively on said second link on opposite sides of said axis in driving engagement with said transmitting means and taking up said excess in length thereof; and means for rocking said second link about said axis, whereby said transmitting means may effect relative rotation of said first and second shafts.

2. Mechanism as set forth in claim 1 wherein the pivotal mounting of said second link provides runs for said transmitting means extending from one of said shafts to said pair of idler members, and wherein rocking of said second link varies the lengths of said runs.

3. Mechanism as set forth in claim 1 wherein said transmitting means interconnects said first and second shafts to effect rotation thereof in opposite directions.

4. Mechanism as set forth in claim 1 wherein said second link is rockable through an angular distance such as to effect relative rotation of said first and second eccentric shafts from a position in which their eccentricities are in phase to a second position in which their eccentricities are 180° out of phase.

5. Mechanism as set forth in claim 1 including a counterweight; and means connecting said counterweight to each of said first and second shafts.

6. Mechanism as set forth in claim 5 wherein said connecting means comprises a pair of connecting rods journaled respectively at corresponding ends on said first and second shafts, and pivotal means at the opposite ends of said pair of connecting rods pivoting the latter to said counterweight.

7. Mechanism as set forth in claim 6 wherein said pivotal means comprises a link pivoted at its midpoint to said counterweight and pivoted at its opposite ends to the respective connecting rods of said pair thereof.

References Cited by the Examiner
UNITED STATES PATENTS

| 2,212,348 | 8/1940 | Ludington | 74—242.8 |
| 2,352,797 | 7/1944 | Miller | 74—217 |
| 3,103,890 | 9/1963 | Griswold | 74—25 X |

FOREIGN PATENTS

| 871,095 | 3/1953 | Germany. |

FRED C. MATTERN, Jr., *Primary Examiner.*

F. E. BAKER, H. C. COLE, *Assistant Examiners.*